June 16, 1925.

A. D. JONES

HEATING DEVICE

Filed June 2, 1924

INVENTOR
Adrian Donnan Jones.
by
Herbert A Gill
Attorney

Patented June 16, 1925.

1,542,506

UNITED STATES PATENT OFFICE.

ADRIAN DENMAN JONES, OF CHAGFORD, ENGLAND.

HEATING DEVICE.

Application filed June 2, 1924. Serial No. 717,388.

*To all whom it may concern:*

Be it known that I, ADRIAN DENMAN JONES, a British subject, and resident of "The Logs," Chagford, in the county of Devon, England, have invented certain new and useful Improvements in Heating Devices (for which I have filed applications in England, dated 21st December, 1923, and 8th May, 1924, respectively), of which the following is a specification.

This invention relates to heating devices making use of the exhaust gases of internal combustion engines. Such heating devices may be employed for example on motor vehicles, motor trains and so forth, on motor boats or in the cabins of aeroplanes, and they may also be used in connection with internal combustion engines installed in a fixed position, wherever the heat of the exhaust gases can usefully be employed for example for heating a room or maintaining a dry atmosphere in a place where moisture would be likely to do damage.

The direct use of exhaust gases for heating purposes is of course well known in itself, and there have been various inventions also for utilizing air heated by the exhaust gases of an engine, for heating foot warmers for example on motor vehicles as in United States Patent Specifications 1,393,093 and 1,441,486. It is the object of the present invention to provide for the more efficient utilization of exhaust gases for heating purposes, and also to provide for the automatic regulation or control of the temperature in an exhaust-heated apparatus so that an excessive temperature can never be reached.

According to the invention exhaust gases, from an internal combustion engine, are passed through one or more tubes, conduits or the like contained in a chamber or casing, the outlet from the tubes or conduits extending into a pipe within the chamber so as to create a pressure below atmospheric pressure thus causing air to be drawn through the chamber in which it is heated. The chamber is in the form of a metal casing adapted to be fitted in the space to be heated or on or under the floor of the space to be heated, the casing being provided with air inlet holes. The tube conduit or the like is arranged so as to extend backwards and forwards or is coiled inside the chamber, or a number of tubes or conduits are disposed in parallel between two headers inside the chamber. Means are preferably provided for controlling the passage of exhaust gases to the tube or tubes, whilst the passage of air through the chamber is also arranged so as to be suitably controlled.

In the accompanying drawings are illustrated diagrammatically various forms of construction according to the invention.

Figure 1:
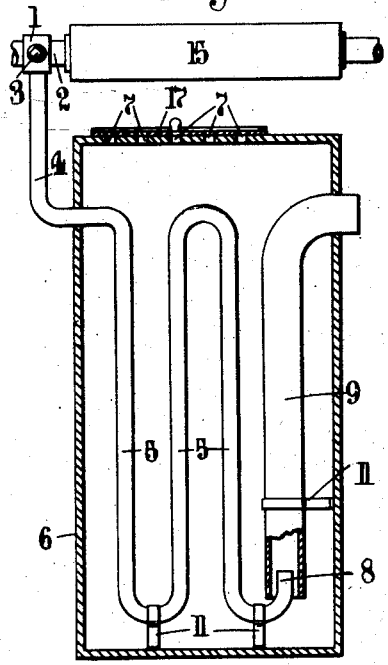
Fig. 1 shows a plan partly in section of one form of construction.

Referring now to Fig. 1 wherein the invention is applied to an arrangement heated by the exhaust gases by-passed from the exhaust pipe, a suitable branch fitting 1 is provided on the exhaust pipe 2 which latter is suitably opened by a valve 3 to permit of the by-passing of the exhaust gases. The exhaust pipe 2 leads in the usual manner to a silencer 15. The fitting is connected, preferably by a flexible pipe 4 to a tube 5 extending backwardly and forwardly inside a metal chamber 6 provided with air inlet holes 7 at any suitable places, for instance near the point at which the exhaust gases enter the chamber 6. The outlet end 8 of the tube projects into a pipe 9 which leads into the atmosphere. By reason of the outflow of gases from the tube 5 an ejection action is produced in the pipe 9 thus creating in the chamber 6 a pressure below atmosphere pressure. The vacuum thus caused draws air in through the air inlet holes 7 and this air in passing over the tube 5 is heated to a suitable temperature and is drawn by the exhaust gases into the pipe 9 and then discharged into the atmosphere.

The air thus drawn in through the chamber serves to prevent any undue rise of temperature and incidentally to prevent any risk of escape of the exhaust gases from the heater into the body of the vehicle or the like in which the heater may be situated. Moreover the heater will retain its heat for a considerable time after the stoppage of the engine, because air is only drawn in so long as there is a blast of exhaust gases through the ejector, so that the flow of cooling air stops when the exhaust discharge stops, and the exhaust gases remaining in the heater will keep it warm for a considerable time.

The metal casing is preferably fitted into, on or under the floor of the vehicle or place to be heated. In order to vary the degree of temperature at which the air will be automatically controlled by the ejector action of the exhaust gases the valve 3 is more or less opened so as to control the passage of exhaust gases through the tube 5. The air admission aperture 7 into the heater casing 6 are controlled by a perforated slide 17 arranged in suitable guides on the chamber 6. The air admission may also be controlled by means of perforated discs for example so that the amount of air admitted to control the temperature of the heater may also be varied at will. The tube 5 and pipe 9 are supported in position inside the chamber 6 by any suitable means such as brackets 11.

Figure 2:
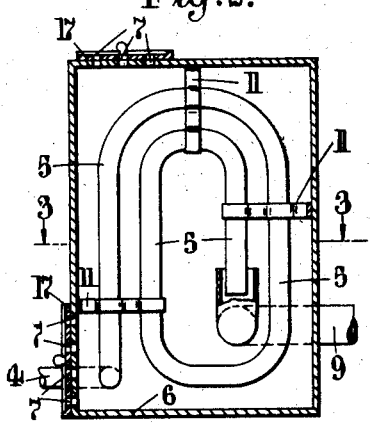
Fig. 2 shows a slight modification of the arrangement shown in Fig. 1.
Figure 3:
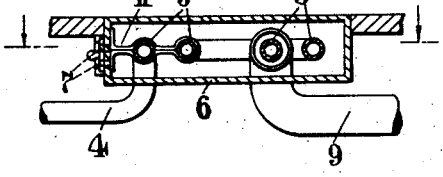
Fig. 3 is a cross section on the line 3—3 of Fig. 2.

In the construction shown in Figs. 2 and 3 the flexible pipe 4 is connected to the tube 5 through the bottom of the chamber 6 and the pipe 9 also passes out through the bottom of the chamber 6. In this arrangement the tube 5 is arranged in the form of a coil instead of passing backwards and forwards as shown in Fig. 1.

Figure 4:
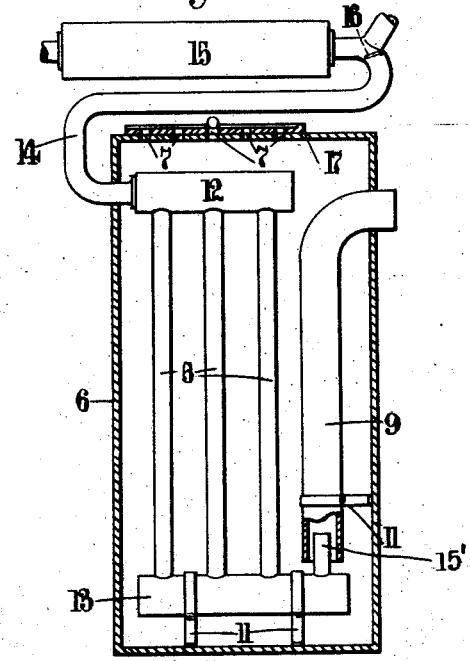
Fig. 4 shows a further modification.

In another form of construction when using the exhaust gases which have passed through a silencer tubes 5 are preferably arranged in parallel inside the casing 6 as shown in Fig. 4, a common connecting member 12 13 for the tubes 5 being provided at each end of the casing so that the exhaust gases will all flow in the same direction through the various tubes. The connecting member 12 is connected, preferably by a flexible pipe 14 to the outlet from the exhaust silencer whilst the other connecting member 13 is provided with a short outlet tube 15' extending into the pipe 9 for conducting the gases into the atmosphere so as to produce an ejection action which will produce the passage of air through the casing 6 in the manner above described. Between the outlet from the silencer 15 and the heating tubes 5 there is provided a suitable valve 16 which according to its position either shuts off the exhaust from the heating tubes completely or allows more or less of the exhaust gases to pass to the heating tubes, provision being made for the exhaust gases not passing through the heating tube to escape freely into the atmosphere.

Although the invention has been described in connection with arrangements wherein silencers are provided for the exhaust gases, it will be understood that the invention is also applicable where silencers are not provided, as for example in aeroplanes. When the invention is adapted to be applied for the heating of the cabins of aeroplanes, part of the exhaust gases are preferably by-passed through the heating device.

It will be understood that various modifications may be made without departing from the scope of the invention. For example instead of using pipes in coils and so forth as above described it will be understood that a relatively large pipe, preferably of flattened section may be used, or any equivalent arrangement providing a sufficient surface area for the transfer of heat from the exhaust gases to the surrounding air in the chamber.

Having thus described my invention what I claim as new and desire to secure by Letters Patent is:—

1. A heating device using exhaust gases of internal combustion engines comprising a chamber, a conduit in said chamber and connected to the source of supply of exhaust gases, and a pipe leading from said chamber, the end of the conduit projecting into the end of said pipe, the chamber having air inlet holes therein, the arrangement being such that the passage of exhaust gases from the conduit into the pipe create a pressure below atmospheric pressure thus causing air to be drawn through the air inlet holes, and over the conduit.

2. A heating device using exhaust gases of internal combustion engines comprising a metal chamber, a coiled tube in said chamber, said tube receiving at one end exhaust gases, a pipe leading from said chamber, the other end of the tube projecting into said pipe, and means for controlling the passage of exhaust gases into said tube, the said chamber being provided with air inlet holes and the arrangement being such that the passage of exhaust gases from the tube into the pipe create a pressure below atmospheric pressure thus causing air to be drawn into the chamber through the air inlet holes, and over said tube.

ADRIAN DENMAN JONES.